Jan. 5, 1960                  G. ELLIS                2,920,275
APPARATUS FOR MEASURING ELECTRIC CURRENT
PULSES OF SHORT DURATION
Filed March 2, 1954
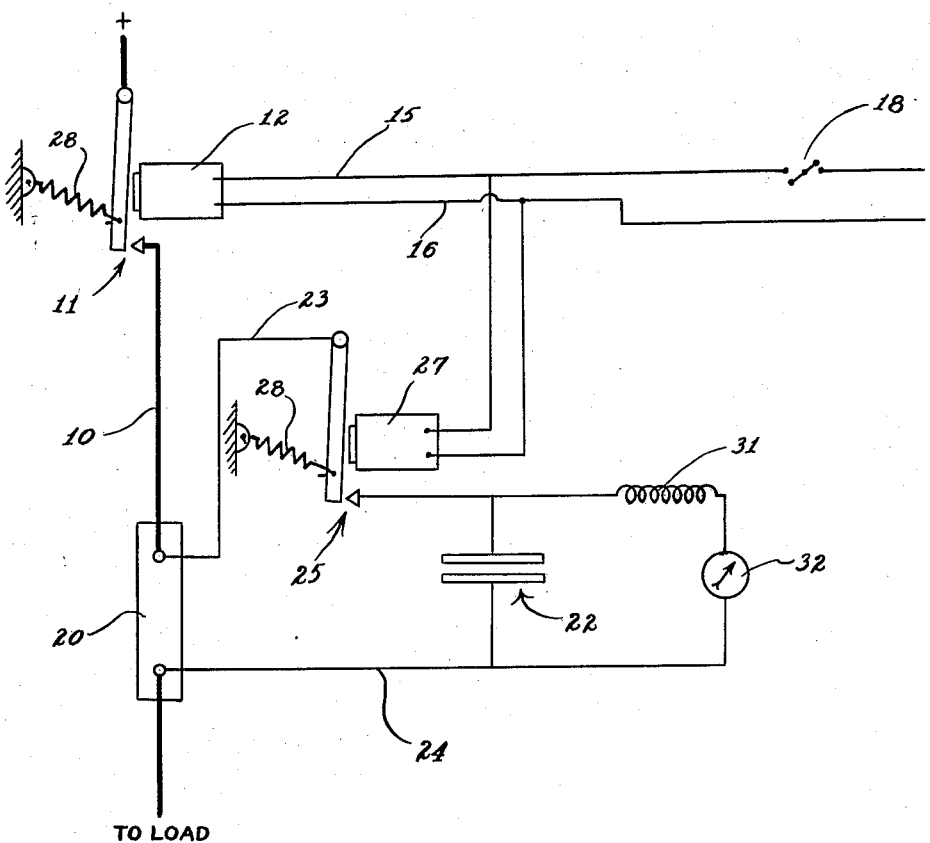
INVENTOR.
BY Drear Ellis
Emery Varney
Whittemore & Dix
ATTORNEYS United States Patent Office 2,920,275
Patented Jan. 5, 1960

2,920,275

APPARATUS FOR MEASURING ELECTRIC CURRENT PULSES OF SHORT DURATION

Greer Ellis, Pelham, N.Y.

Application March 2, 1954, Serial No. 413,694

2 Claims. (Cl. 324—102)

This invention relates to apparatus for measuring the intensity of electric currents.

When metal articles are tested for flaws by the magnetic particle inspection method, extremely heavy currents are used, for example, up to 6,000 amperes of direct current. The duration of the current pulse is so short that it is difficult to measure it. Conventional measuring equipment does not respond quickly enough.

It is an object of this invention to provide improved apparatus for measuring the intensity of electric currents, more especially direct currents, regardless of how short the time interval during which the current flows. Another object is to provide a memory function so that short duration pulses can be read when convenient at a later time. In addition to being useful with magnetic particle inspection methods, the invention can also be used for measuring the intensity of the current used for spot welding, with direct current.

In accordance with one feature of the invention, a capacitor is connected in parallel with a low resistance conductor in the circuit in which the intensity of the current is to be measured. The capacitor input circuit is one having a time constant which is less than the duration of the current pulse to be measured, and preferably only one-tenth of the duration of the current pulse. The current is measured indirectly in the discharge circuit of the capacitor.

Other objects, features and advantages of the invention will appear or be pointed out as the description proceeds.

The drawing is a wiring diagram showing a circuit and apparatus for measuring the intensity of a current pulse in accordance with this invention.

The heavy current which is to be measured flows in a circuit having a conductor 10. There is a switch 11 in the circuit and the pulse of current is discharged into the conductor 10 when the switch 11 closes. This switch 11 is preferably a relay and is actuated by a coil 12 in a control circuit with conductors 15 and 16 leading to a power line. The control circuit is opened and closed by a manually-operated or automatically timed switch 18.

In series with the conductor 10, there is another conductor consisting of a low resistance element 20, of known resistance, through which the entire current to be measured will pass when the circuit is closed by closing of the switch 11.

A capacitor 22 is connected across the low resistance conductor element 20 by conductors 23 and 24. There is a switch 25 in series with the conductor 23 for connecting and disconnecting the capacitor 22 from the circuit. This switch 25 is actuated by a coil 27 connected in parallel with the coil 12 of the control circuit; so that when the control switch 18 is closed, the coils 12 and 27 close their respective switches 11 and 25. Likewise, both of the switches 11 and 25 open, under the influence of spring biasing means 28, whenever the coils 12 and 27 are de-energized by opening of the control switch 18. The closing of the switches 11 and 25 by a common control is not important, but it is important to prevent the switch 11 from opening ahead of the switch 25 with resulting discharge of the capacitor 22 through the low resistance element 20. The common control switch 18 is representative of means for preventing opening of the circuit through the resistance element 20 ahead of the opening of the capacitor charging circuit.

A high impedance 31 and a galvanometer 32 are connected in series across the capacitor 22. This impedance 31 and the galvanometer 32, together with the conductors in series with them, constitute the discharge circuit of the capacitor 22. The conductors 23 and 24, conductor element 20 and the switch 25 constitute the charging circuit of the capacitor 22.

The theoretical time constant for the capacitor 22 is equal to the resistance of the circuit multiplied by the capacitance. In actual practice capacitors do not charge as quickly as the theoretical computations would indicate, and it is therefore desirable to have the time constant of the capacitor 22, and its input circuit, less than that theoretically required. Experience shows that the capacitor 22 will acquire 90% of its full charge within the theoretically computed time, but in the preferred embodiment of this invention, the capacitor 22 is made with a time constant in its input circuit of only one tenth of the duration of the high intensity current pulse which is to be measured.

The capacitor 22 is preferably an electrolytic capacitor; and the discharge circuit of the capacitor 22 preferably has an impedance equal to at least 10,000 times the impedance of the charging circuit.

In the operation of the apparatus, the switch 11 is closed, and a heavy pulse of current discharges through the conductor 10 and the low resistance conductor element 20 producing a voltage drop across the capacitor 22. This causes the capacitor 22 to charge, and as soon as the charging voltage across the low resistance conductor element 20 is removed by opening of the switch 27, the capacitor 22 will begin to discharge through its discharge circuit comprising the high impedance 31 and the galvanometer 32. The switch 25 opens sooner than the switch 11 when the control circuit is opened by the switch 18.

In the preferred construction of the invention, when the power supply to the coils 12 and 27 is shut off, by the opening of the switch 18, the switch 25 opens ahead of the switch 11 and thus opens the charging circuit of the capacitor 22 while the current is still flowing in the low resistance element 20 and before there is any substantial decrease in the voltage of the charging circuit of the capacitor 22. The switch 25 opens ahead of the switch 11 because the switch 25, which carries only a small fraction of the current carried by the switch 11, is lighter and opens more quickly because of its smaller inertia. The spring 28, of the switch 25 is strong enough to insure the opening of the switch 25 ahead of the switch 11.

Because of the high impedance of the discharge circuit, the rate of discharge of the condenser 22 is low and the current measured by the galvanometer 32 is an indication of the charge on the capacitor 22 which is in turn a measure of the voltage across the low resistance conductor element 20. Since the resistance of the element 20 is known, this voltage is an indication of the current through the element 20. The galvanometer 32 can be calibrated and graduated to indicate directly the intensity of the current in the circuit of the conductors 10 and 20.

When the apparatus is used with a circuit in which successive pulses of heavy current flow through the conductor 20, the first pulse will not ordinarily charge the capacitor 22 to its maximum extent; but by the time that the third pulse flows through the circuit of the conductors 10 and 20, the capacitor 22 has reached its full charge and the reading on the galvanometer 32 gives a result within one percent of the actual current flow in the circuit in which the current is being measured.

For instances where the circuit is to be used to measure a heavy current flow which will be only a single pulse, the galvanometer 32 can be calibrated so as to compensate the failure of the capacitor 22 to acquire a maximum charge with only a single pulse of voltage across the conductor 20; but in the preferred method of using the invention, a computed calibration factor is used, when there is only one pulse, to correct the observed reading of the galvanometer 32, instead of calibrating the galvanometer for the single pulse operating condition. This use of a calibration factor is the more practical plan because the response of the apparatus is different for different current intensities of a single pulse, and the galvanometer is used with a table of calibration factors worked out for different single pulse conditions that are to be measured.

The preferred embodiment of the invention has been illustrated and described, but changes and modifications can be made, and some features can be used in different combinations without departing from the invention as defined in the claims.

What is claimed is:

1. Apparatus for measuring the intensity of very heavy pulses of direct current which persist for short durations of time, said apparatus including, in combination, a conductor element of low and predetermined resistance and through which passes the pulse of current to be measured, a capacitor connected across said conductor element and having with its connections to said conductor a time constant less than the period of the current pulse to be measured, and equal to approximately one-tenth of the period of the current pulse, a mechanical switch operable to close the circuit by which the capacitor is connected across said conductor element and to open said circuit before termination of the pulse, other switch means in series with the conductor element and located in position to carry the current pulse to be measured, common control means that open and close the mechanical switch and said switch means, and a discharge circuit for the capacitor including a galvanometer and a high impedance connected in series with the galvanometer for delaying the rate at which the capacitor discharges through the galvanometer, said galvanometer being graduated to read directly in terms of current passing through the low resistance conductor element of the circuit in which the current is to be measured.

2. Apparatus for measuring the intensity of very heavy pulses of direct current which persist for short durations of time, said apparatus including, in combination, a conductor element of low and predetermined resistance and through which passes the pulse of current to be measured, a capacitor connected across said conductor element and having with its connections to said conductor a time constant less than the period of the pulse to be measured, a mechanical switch operable to close the circuit by which the capacitor is connected across said conductor element and to open said circuit before termination of the pulse, other switch means in series with the conductor element and located in position to carry the current pulse to be measured, control means for opening and closing the mechanical switch and said switch means, and a discharge circuit for the capacitor including a galvanometer and a high impedance connected in series with the galvanometer for delaying the rate at which the capacitor discharges through the galvanometer, said galvanometer being graduated to read in units representing current passing through the low resistance conductor element of the circuit in which the current is to be measured.

References Cited in the file of this patent

UNITED STATES PATENTS

| | | |
|---|---|---|
| 2,014,102 | Conklin | Sept. 10, 1935 |
| 2,445,773 | Frost | July 27, 1948 |
| 2,615,934 | Mackta | Oct. 28, 1952 |
| 2,654,860 | Lewis | Oct. 6, 1953 |
| 2,741,756 | Stocker | Apr. 10, 1956 |

FOREIGN PATENTS

| | | |
|---|---|---|
| 649,839 | Germany | June 9, 1933 |